(12) United States Patent
Vankamamidi et al.

(10) Patent No.: US 12,229,421 B1
(45) Date of Patent: Feb. 18, 2025

(54) SYSTEM AND METHOD FOR DYNAMIC RESOURCE OVER-PROVISIONING IN LOG STRUCTURES

(71) Applicant: Dell Products L.P., Round Rock, TX (US)

(72) Inventors: Vamsi Vankamamidi, Hopkinton, MA (US); Amital Alkalay, Kadima (IL); Steven Morley, Mendon, MA (US)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 18/363,071

(22) Filed: Aug. 1, 2023

(51) Int. Cl.
*G06F 3/06* (2006.01)

(52) U.S. Cl.
CPC ............ *G06F 3/0631* (2013.01); *G06F 3/061* (2013.01); *G06F 3/0679* (2013.01)

(58) Field of Classification Search
CPC ....... G06F 3/0631; G06F 3/061; G06F 3/0679
See application file for complete search history.

(56) References Cited

U.S. PATENT DOCUMENTS

| | | | |
|---|---|---|---|
| 2015/0113223 A1* | 4/2015 | Brown | G06F 12/0893 711/133 |
| 2021/0389889 A1* | 12/2021 | Tsai | G06Q 10/06315 |
| 2022/0058043 A1* | 2/2022 | Wang | G06F 16/188 |
| 2022/0171537 A1* | 6/2022 | Szczepanik | G06F 3/0665 |

* cited by examiner

*Primary Examiner* — Edward J Dudek, Jr.
(74) *Attorney, Agent, or Firm* — Brian J. Colandreo; Heath M. Sargeant; Holland & Knight LLP

(57) ABSTRACT

A method, computer program product, and computing system for determining an amount of data moved within a plurality of write input/output (IO) log structures of a storage system during a monitoring interval. A utilization value for each write IO log structure may be determined during the monitoring interval. Over-provisioning resources are allocated from the storage system to the plurality of write IO log structures based upon, at least in part, the amount of data moved within each write IO log structure and the utilization value for each write IO log structure.

20 Claims, 6 Drawing Sheets

SYSTEM AND METHOD FOR DYNAMIC RESOURCE OVER-PROVISIONING IN LOG STRUCTURES

BACKGROUND

Storing and safeguarding electronic content may be beneficial in modern business and elsewhere. Accordingly, various methodologies may be employed to protect and distribute such electronic content.

In a log-structured storage system, write input/outputs (IOs) are accumulated and logged to free-segments within the log system. If the write IO is an over-write (i.e., rewrite of a previously written block), then in addition to logging the new version to a free segment, the previous version must be marked/treated as invalidated. Log systems have a background garbage-collection process to recover the storage associated with invalidated blocks and create free segments. Additionally, write-amplification associated with garbage collection is given by $1/(1-U)$, where U is the utilization of the log system. As such, the higher the utilization of the log system, the greater the cost of garbage collection.

SUMMARY OF DISCLOSURE

In one example implementation, a computer-implemented method executed on a computing device may include, but is not limited to, determining an amount of data moved within a plurality of write input/output (IO) log structures of a storage system during a monitoring interval. A utilization value for each write IO log structure may be determined during the monitoring interval. Over-provisioning resources are allocated from the storage system to the plurality of write IO log structures based upon, at least in part, the amount of data moved within each write IO log structure and the utilization value for each write IO log structure.

One or more of the following example features may be included. A first write IO log structure may include a data write IO log structure. A second write IO log structure may include a metadata write IO log structure. Determining the amount of data moved within each write IO log structure may include determining an amount of write amplification for each write IO log structure. Determining the amount of data moved within the plurality of write IO log structures may include determining a normalized amount of data moved within each write IO log structure based upon, at least in part, an amount of valid memory in each write IO log structure and an amount of free memory in each write IO log structure. Allocating over-provisioning resources from the storage system to the plurality of write IO log structures may include determining that the normalized amount of data moved within each write IO log structure varies from one another by more than a predefined threshold. A write IO log structure with a smallest normalized amount of data moved may be identified and the utilization value for the write IO log structure may be increased. Increasing the utilization value may include reclaiming free storage capacity from the write IO log structure. A write IO log structure with a largest normalized amount of data moved may be identified and the utilization value for the write IO log structure may be reduced. Reducing the utilization value may include allocating additional storage capacity to the write IO log structure.

In another example implementation, a computer program product resides on a computer readable medium that has a plurality of instructions stored on it. When executed by a processor, the instructions cause the processor to perform operations that may include, but are not limited to, determining an amount of data moved within a plurality of write input/output (IO) log structures of a storage system during a monitoring interval. A utilization value for each write IO log structure may be determined during the monitoring interval. Over-provisioning resources are allocated from the storage system to the plurality of write IO log structures based upon, at least in part, the amount of data moved within each write IO log structure and the utilization value for each write IO log structure.

One or more of the following example features may be included. A first write IO log structure may include a data write IO log structure. A second write IO log structure may include a metadata write IO log structure. Determining the amount of data moved within each write IO log structure may include determining an amount of write amplification for each write IO log structure. Determining the amount of data moved within the plurality of write IO log structures may include determining a normalized amount of data moved within each write IO log structure based upon, at least in part, an amount of valid memory in each write IO log structure and an amount of free memory in each write IO log structure. Allocating over-provisioning resources from the storage system to the plurality of write IO log structures may include determining that the normalized amount of data moved within each write IO log structure varies from one another by more than a predefined threshold. A write IO log structure with a smallest normalized amount of data moved may be identified and the utilization value for the write IO log structure may be increased. Increasing the utilization value may include reclaiming free storage capacity from the write IO log structure. A write IO log structure with a largest normalized amount of data moved may be identified and the utilization value for the write IO log structure may be reduced. Reducing the utilization value may include allocating additional storage capacity to the write IO log structure.

In another example implementation, a computing system includes at least one processor and at least one memory architecture coupled with the at least one processor, wherein the at least one processor configured to determine an amount of data moved within a plurality of write input/output (IO) log structures of a storage system during a monitoring interval. A utilization value for each write IO log structure may be determined during the monitoring interval. Over-provisioning resources are allocated from the storage system to the plurality of write IO log structures based upon, at least in part, the amount of data moved within each write IO log structure and the utilization value for each write IO log structure.

One or more of the following example features may be included. A first write IO log structure may include a data write IO log structure. A second write IO log structure may include a metadata write IO log structure. Determining the amount of data moved within each write IO log structure may include determining an amount of write amplification for each write IO log structure. Determining the amount of data moved within the plurality of write IO log structures may include determining a normalized amount of data moved within each write IO log structure based upon, at least in part, an amount of valid memory in each write IO log structure and an amount of free memory in each write IO log structure. Allocating over-provisioning resources from the storage system to the plurality of write IO log structures may include determining that the normalized amount of data moved within each write IO log structure varies from one another by more than a predefined threshold. A write IO log structure with a smallest normalized amount of data moved may be identified and the utilization value for the write IO log structure may be increased. Increasing the utilization value may include reclaiming free storage capacity from the write IO log structure. A write IO log structure with a largest normalized amount of data moved may be identified and the utilization value for the write IO log structure may be reduced. Reducing the utilization value may include allocating additional storage capacity to the write IO log structure.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
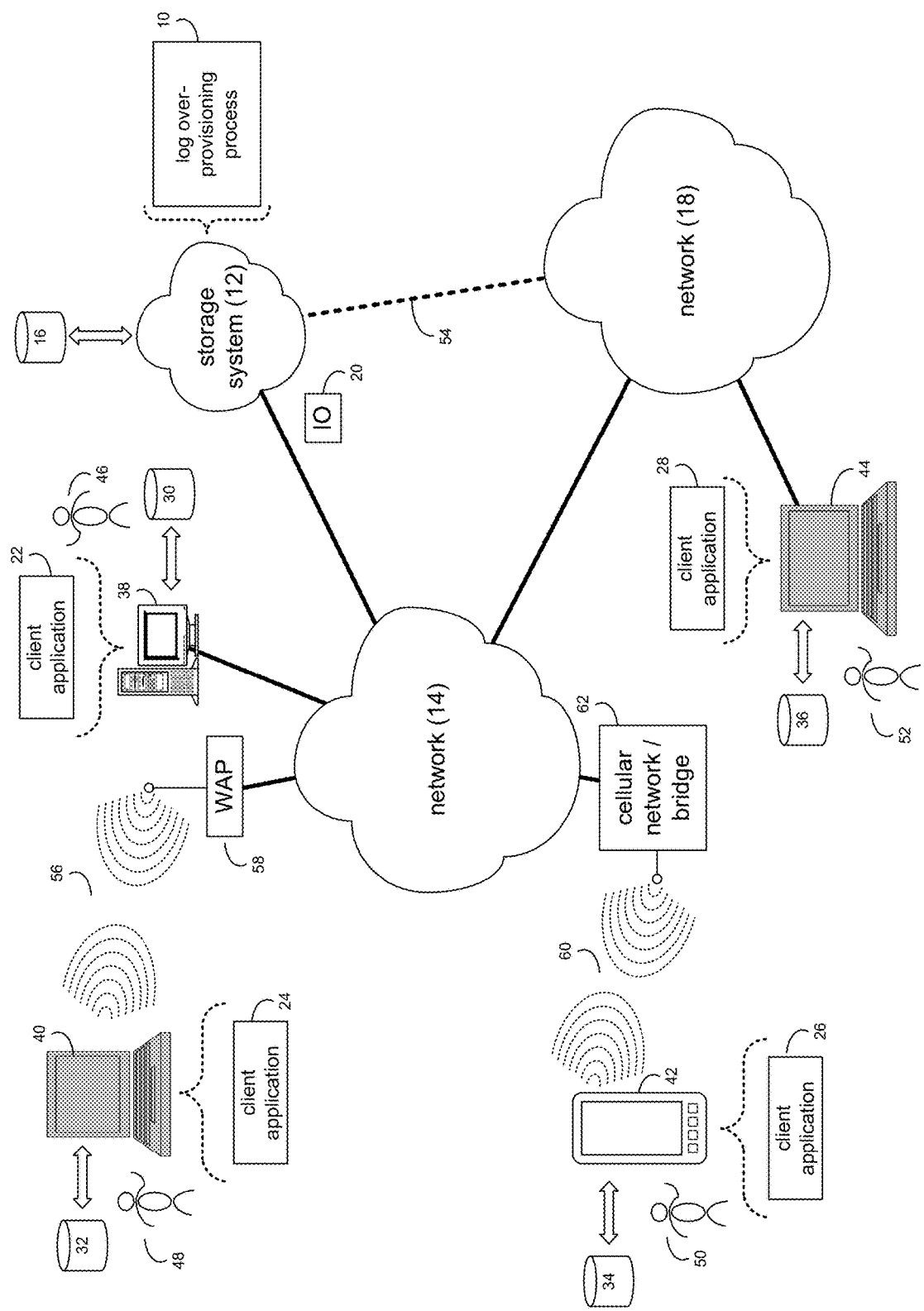
FIG. 1 is an example diagrammatic view of a storage system and a log over-provisioning process coupled to a distributed computing network according to one or more example implementations of the disclosure.

Referring to FIG. 1, there is shown log over-provisioning process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of log over-provisioning process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of log over-provisioning process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11 g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a log over-provisioning process, such as log over-provisioning process 10 of FIG. 1, may include but is not limited to, determining an amount of data moved within a plurality of write input/output (IO) log structures of a storage system during a monitoring interval. A utilization value for each write IO log structure may be determined during the monitoring interval. Over-provisioning resources are allocated from the storage system to the plurality of write IO log structures based upon, at least in part, the amount of data moved within each write IO log structure and the utilization value for each write IO log structure.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
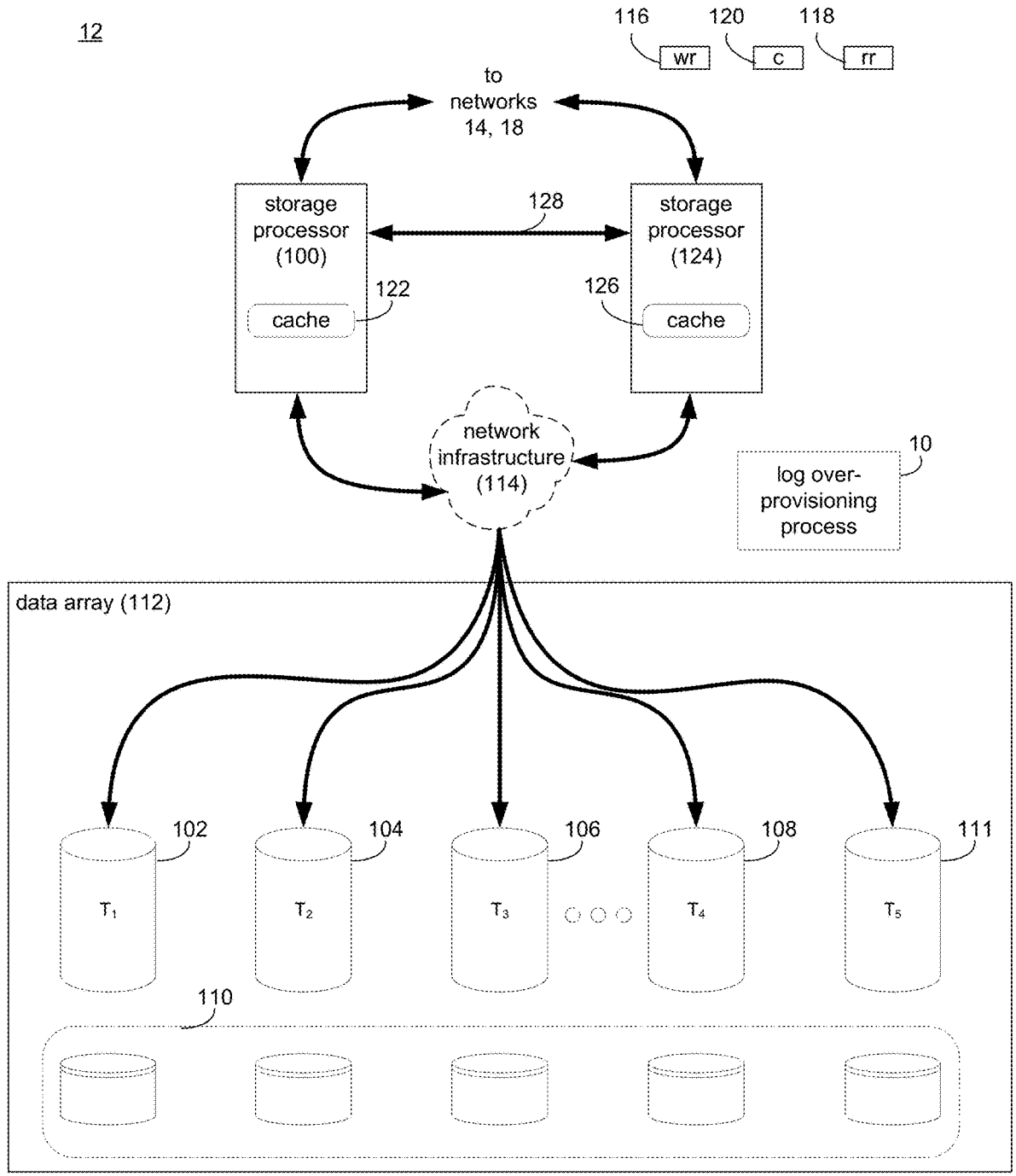
FIG. 2 is an example diagrammatic view of the storage system of FIG. 1 according to one or more example implementations of the disclosure.
Figure 3:
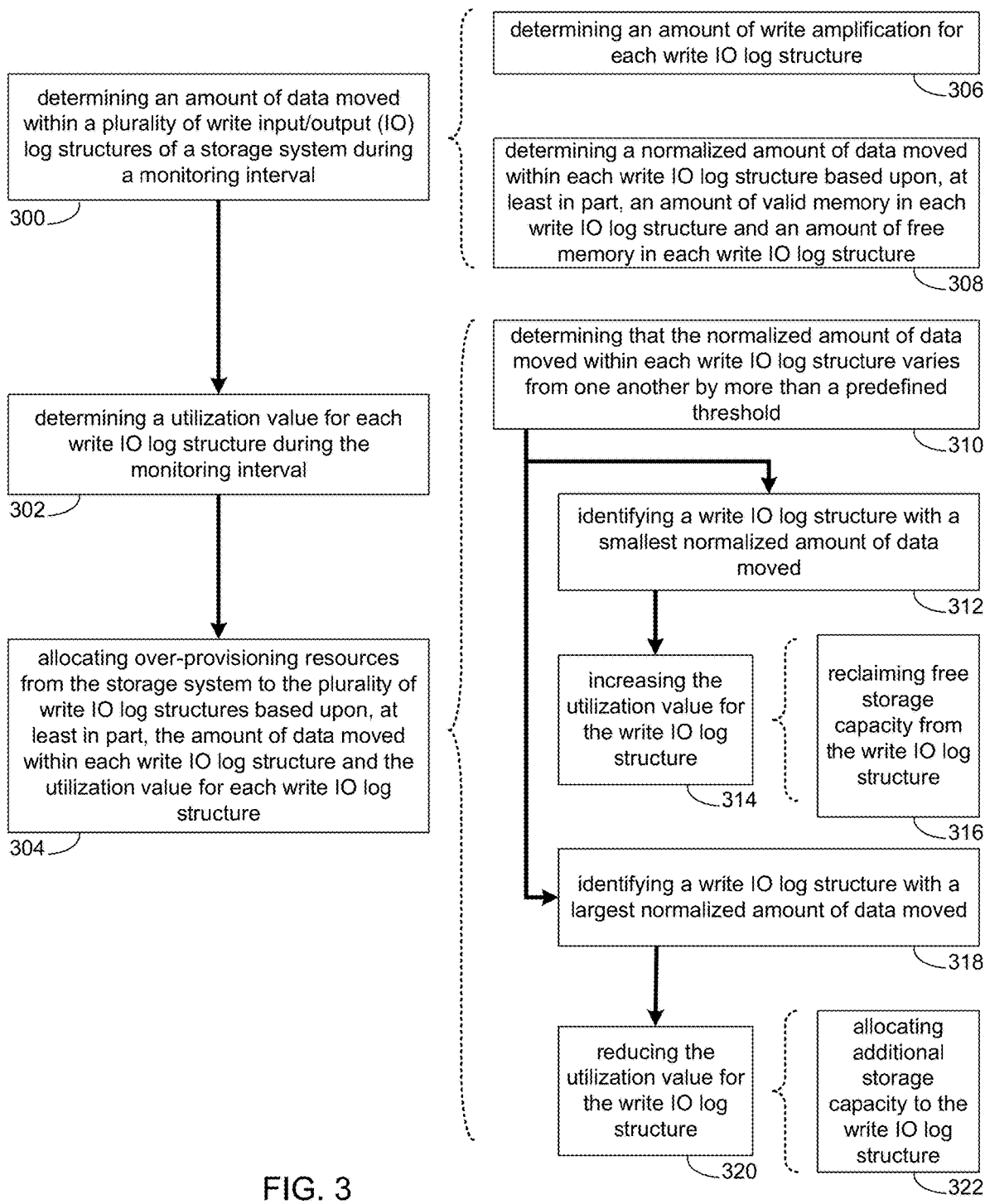
FIG. 3 is an example flowchart of log over-provisioning process according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of log over-provisioning process 10. The instruction sets and subroutines of log over-provisioning process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of log over-provisioning process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of log over-provisioning process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of log over-provisioning process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Log Over-Provisioning Process:

Referring also to the examples of FIGS. 3-6 and in some implementations, log over-provisioning process 10 may determine 300 an amount of data moved within a plurality of write input/output (IO) log structures of a storage system during a monitoring interval. A utilization value for each write IO log structure may be determined 302 during the monitoring interval. Over-provisioning resources are allocated 304 from the storage system to the plurality of write IO log structures based upon, at least in part, the amount of data moved within each write IO log structure and the utilization value for each write IO log structure.

As will be discussed in greater detail below, implementations of the present disclosure may allow for dynamic over-provisioning of storage system resources for a plurality of write IO log structures. For example, in a storage system there may be a write IO log structure for logging user data within a storage system and another write IO log structure for logging metadata. Generally, the storage capacity ratio between data and metadata is generally very high (e.g., 95:5 or 90:10, etc.). However, the ratio of write-bandwidth for data write IOs and metadata write IOs is quite different. Depending on the workload, it can vary significantly (e.g., 70:30, 50:50, etc.). This ratio is generally lower than the storage capacity ratio. Accordingly, metadata write IOs typically require much more write-bandwidth per storage unit (e.g., gigabyte) than data write IOs. To account for these variations, conventional approaches provide additional resources to different write IO log structures. However, such approaches typically provide the same amount of over-provisioning to each type of write IO log structure. As such, when a metadata write IO log structure begins to saturate, insufficient resources are provided to the metadata write IO log structure while the data write IO log structure has an excess of resources for processing write IOs. In this manner, conventional approaches result in efficient storage system resource allocation and, as such, reduce overall storage system performance.

In some implementations, log over-provisioning process 10 determines 300 an amount of data moved within a plurality of write input/output (IO) log structures of a storage system during a monitoring interval. A write IO log structure may generally include a non-volatile random access memory (NVRAM) device configured to provide a log of the data (e.g., write IOs) written to a storage system. For example, the contents of the write IO log structure may be preserved in the event of a power failure or other failure of a cache memory system. In some implementations and in response to the failure of the cache memory system, log over-provisioning process 10 may recover data from the write IO log structure.

In some implementations, log over-provisioning process 10 may process data to store in a storage system. For example, log over-provisioning process 10 may process a plurality of IO operations using the storage node. For example and referring also to FIG. 4, suppose a host (e.g., host 400) sends an IO request (e.g., IO request 402) to write data to a storage array (e.g., data array 112) using a storage node (e.g., storage node 100). In this example, log over-provisioning process 10 may write the data (e.g., data 404) to the processing storage node (e.g., storage node 100). In some implementations, data may be stored in the storage system in predefined portion sizes or segments. In one example, segment is four kilobytes (4 KB). In another example, each segment is eight kilobytes (8 KB). However, it will be appreciated that the segment size may be specifically defined (e.g., user-defined or automatically defined) for each storage system or application within the scope of the present disclosure.

Figure 4:
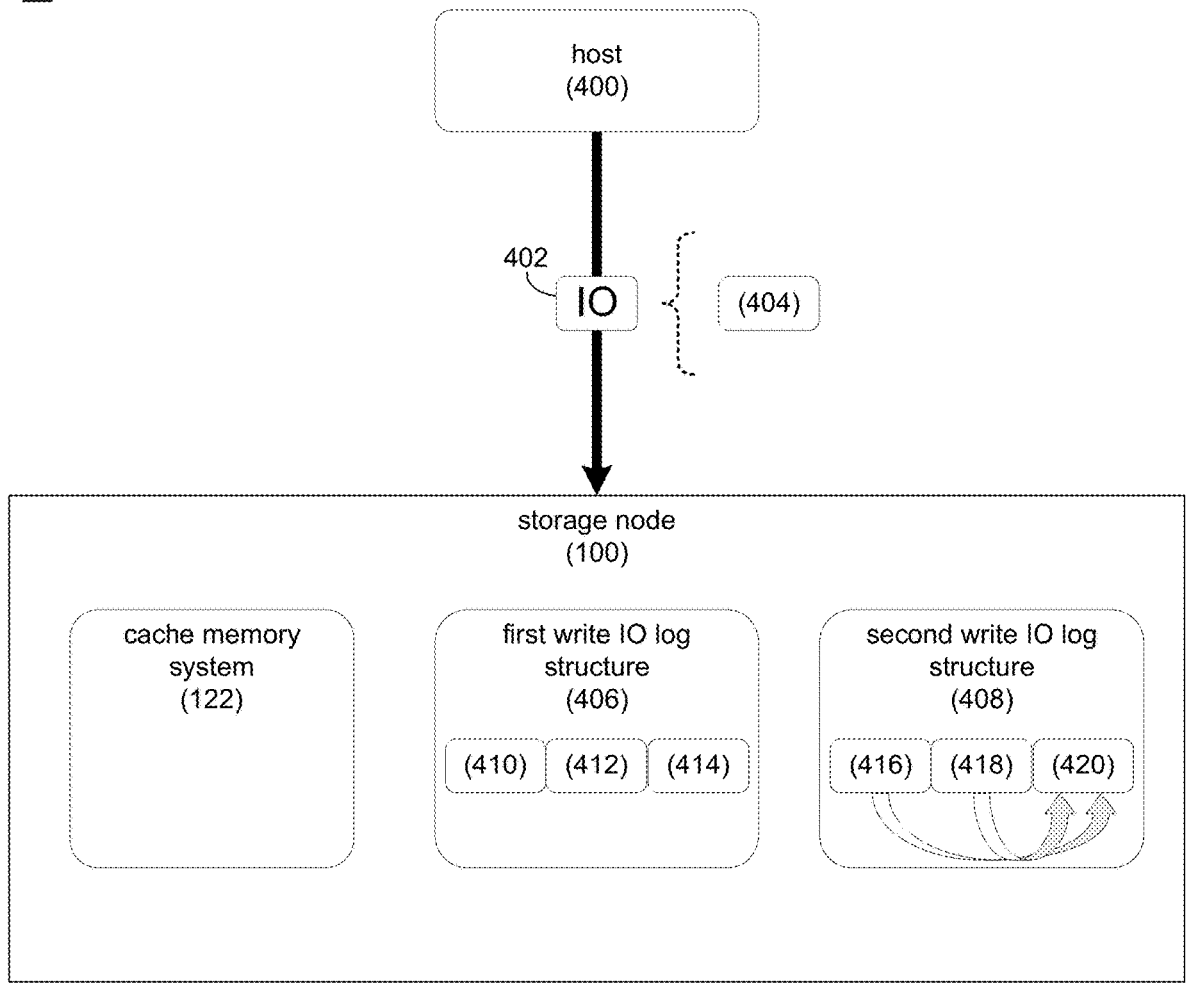
FIGS. 4-6 are example diagrammatic views of the storage system of FIG. 1 according to various example implementations of the disclosure.

In some implementations, log over-provisioning process 10 includes a plurality of write IO log structures (e.g., first write IO log structure 406 and second write IO log structure 408) for logging write IOs. For example, the first write IO log structure (e.g., first write IO log structure 406) may include a data write IO log structure (i.e., a write IO log structure designated for logging user data write IOs) and the second write IO log structure (e.g., second write IO log structure 408) may include a metadata write IO log structure (i.e., a write IO log structure designated for logging metadata write IOs). As shown in FIG. 4, log over-provisioning process 10 logs the data from IO request 402 (e.g., a write IO) in either first write IO log structure 406 or second write IO log structure 408 depending the type of data in IO request 402 (e.g., user data to first write IO log structure 406 and metadata to second write IO log structure 408).

In some implementations, the storage capacity ratio between a data write IO log structure (e.g., first write IO log structure 406) and a metadata write IO log structure (e.g., second write IO log structure 408) may be very high (e.g., 95:5 or 90:10, etc.). However, the ratio of write-bandwidth for data write IOs and metadata write IOs can vary significantly depending on the workload (e.g., 70:30, 50:50, etc.). As such, the write-bandwidth ratio is generally lower than the storage capacity ratio. Accordingly, metadata write IOs typically require much more write-bandwidth per storage unit (e.g., gigabyte) than data write IOs. As will be discussed in greater detail below, log over-provisioning process 10 allocates 304 over-provisioning resources from the storage system in a dynamic manner that provides different amounts of over-provisioning resources to each write IO log structure based upon, at least in part, an amount of data moved during a monitoring interval and a utilization value for each write IO log structure during the monitoring interval.

In some implementations, log over-provisioning process 10 determines 300 an amount of data moved within a plurality of write IO log structures of a storage system during a monitoring interval. For example and as shown in FIG. 4, suppose that first write IO log structure 406 includes a plurality of segments or blocks (e.g., segments 410, 412, 414). Each segment may include a fixed amount of data from a write IO and/or information associated with a write IO. In one example, each segment includes the same storage capacity. In another example, each segment includes unique storage capacities based on the write IOs. As write IOs are accumulated in first write IO log structure 406, existing write IOs may be overwritten. As such and in addition to logging a new version of the data to a free segment, the previous version must be marked/treated as invalidated. Each write IO log structure may have a background garbage-collection process to recover the storage associated with invalidated segments and create free segments. For example, suppose that a first write IO is stored in first write IO log structure 406 in segment 410. Now, suppose that subsequent to processing a write IO in segment 410, a second write IO is received that overwrites the first write IO. In this example, the second write IO is written to another segment (e.g., segment 412). Subsequent to processing the second write IO, first write IO log structure 406 moves the data from segment 410 to reclaim the storage capacity for subsequent storing of write IOs. As such, log over-provisioning process 10 determines that one segment (e.g., segment 410) is moved during a monitoring interval. In this example, log over-provisioning process 10 determines the amount of bytes of segment 410 as the amount of data moved during the monitoring interval.

Additionally, the write IO log structure may include various data compression and/or deduplication processes that move data between segments that allow for more data to be stored in fewer segments and/or that remove duplicate segments from the write IO log structure. Accordingly, moving data within a write IO log structure generally includes any movement of data stored in a write IO log structure not associated with flushing or persisting the data from the write IO log structure to persistent storage. In this manner, log over-provisioning process 10 determines 300 the amount of data (e.g., in terms of segments, storage capacity (e.g., kilobytes, gigabytes, etc.)) moved within a monitoring interval. The monitoring interval may include any period of time and may be a default value (e.g., one minute, five minutes, thirty minutes, one hour, twenty-four hours, etc.) and/or a user-defined value (e.g., using a user interface).

In some implementations, determining 300 the amount of data moved within each write IO log structure includes determining 306 an amount of write amplification for each write IO log structure. As discussed above, the amount of data moved within the monitoring interval can result in significant write IO log structure resource consumption. For example, write amplification associated with garbage collection is defined by 1/(1−U), where U is the utilization of the write IO log structure. Write amplification occurs any time a write IO that is initially written to the storage system is written or moved within the write IO log structure before being stored in persistent, long-term storage. For example, suppose that the data of a write IO is written initially to a segment (e.g., segment 416) in second write IO log structure 408. Now suppose that that data is subsequently combined with other data (e.g., segment 418) in a data compression operation into a new segment (e.g., segment 420). As such, the contents of segment 416 are rewritten to a new segment (e.g., segment 420) resulting in a write amplification of two (i.e., the initial writing to second write IO log structure 408 and the subsequent moving of the data from segment 416 to segment 420 during data compression). With write amplification, the higher the utilization of the write IO log structure, the greater the cost of garbage collection in terms of write IO log structure storage resources (e.g., capacity and write bandwidth). Similar write IO log structure resource consumption may be observed from other data movement processes (e.g., data decompression, data deduplication, etc.). In some implementations, log over-provisioning process 10 determines 306 the amount of write amplification for each write IO log structure as shown in Equation 1:

$$WAMP_{write\ IO\ log\ structure\ (n)} = \frac{(\text{amount of data written}_n + \text{amount of data moved}_n)}{\text{amount of data written}_n} \quad (1)$$

where $WAMP_{write\ IO\ log\ structure\ (n)}$ represents the write amplification of the "nth" write IO log structure, amount of data written$_n$ represents the amount of data written to the "nth" write IO log structure during the monitoring interval, and amount of data moved$_n$ represents the amount of data moved within the "nth" write IO log structure during the monitoring interval.

In some implementations, determining 300 the amount of data moved within the plurality of write IO log structures includes determining 308 a normalized amount of data moved within each write IO log structure based upon, at least in part, an amount of valid memory in each write IO log structure and an amount of free memory in each write IO log structure. For example, the normalized amount of data moved within each write IO log structure may be determined 308 using an amount of valid memory (i.e., memory allocated to the write IO log structure that is used/occupied with data) in each write IO log structure and an amount of free memory in each write IO log structure (i.e., memory allocated to the write IO log structure that is unused/not occupied by any data). In some implementations, log over-provisioning process 10 determines 308 the normalized amount of amount of data moved within each write IO log structure as shown in Equation 2:

$$\text{normalized amount of data moved}_n = \quad (2)$$

$$\frac{\text{amount of data moved}_n}{\text{amount of valid memory}_n + \text{amount of free memory}_n}$$

where normalized amount of data moved n represents the amount of data moved per storage unit (e.g., gigabytes) allocated to the "nth" write IO log structure, amount of valid memory$_n$ represents the amount of used or occupied data that is allocated to the "nth" write IO log structure during the monitoring interval, amount of free memory$_n$ represents the amount of unused data that is allocated to the "nth" write IO log structure during the monitoring interval, and amount of data moved$_n$ represents the amount of data moved within the "nth" write IO log structure during the monitoring interval.

In some implementations, log over-provisioning process 10 determines 302 a utilization value for each write IO log structure during the monitoring interval. For example, the utilization value is a ratio of the amount of valid memory (i.e., memory allocated to the write IO log structure that is used/occupied with data) in a write IO log structure from the total memory allocated to the write IO log structure. In some implementations, log over-provisioning process 10 determines 302 the utilization for each write IO log structure as shown in Equation 3:

$$\text{utilization value}_n = \frac{\text{amount of valid memory}_n}{\text{amount of valid memory}_n + \text{amount of free memory}_n} \quad (3)$$

where amount of valid memory$_n$ represents the amount of used or occupied data that is allocated to the "nth" write IO log structure during the monitoring interval and amount of free memory$_n$ represents the amount of unused data that is allocated to the "nth" write IO log structure during the monitoring interval.

In some implementations, log over-provisioning process 10 allocates 304 over-provisioning resources from the storage system to the plurality of write IO log structures based upon, at least in part, the amount of data moved within each write IO log structure and the utilization value for each write IO log structure. Over-provisioning resources generally include storage capacity and write-bandwidth that can be allocated to a write IO log structure from a storage system. For example, when initializing write IO log structures within storage system 12, log over-provisioning process 10 allocates certain resources (e.g., in terms of storage capacity and write-bandwidth) to each write IO log structure. In one example, the initial resource allocation is a default value (e.g., a default amount of storage capacity and write-bandwidth to each write IO log structure). In another example, log over-provisioning process 10 provides a user-defined resource application to each write IO log structure. As discussed above, because different types of write IO log structures experience different types of data movement, utilization, and write amplification, conventional approaches that provide the same amount of over-provisioning resources result in insufficient resources being allocated to certain write IO log structures (e.g., metadata write IO log structures) while other write IO log structures are over-allocated resources resulting in reduced storage system performance. However, log over-provisioning process 10 allows for the dynamic allocation of over-provisioning resources based upon, at least in part, the amount of data moved for each write IO log structure and the utilization value for each write IO log structure.

In some implementations, allocating 304 over-provisioning resources from the storage system to the plurality of write IO log structures includes determining 310 that the normalized amount of data moved within each write IO log structure varies from one another by more than a predefined threshold. For example, after each monitoring interval, log over-provisioning process 10 compares the normalized amount of data moved within each write IO log structure to one another and determines whether a difference between the normalized amount of data moved exceeds a predefined threshold. In some implementations, the predefined threshold is indicative of a balanced distribution of resources among the plurality of write IO log structures. The predefined threshold may be a default value and/or may be a user-defined value.

Figure 5:
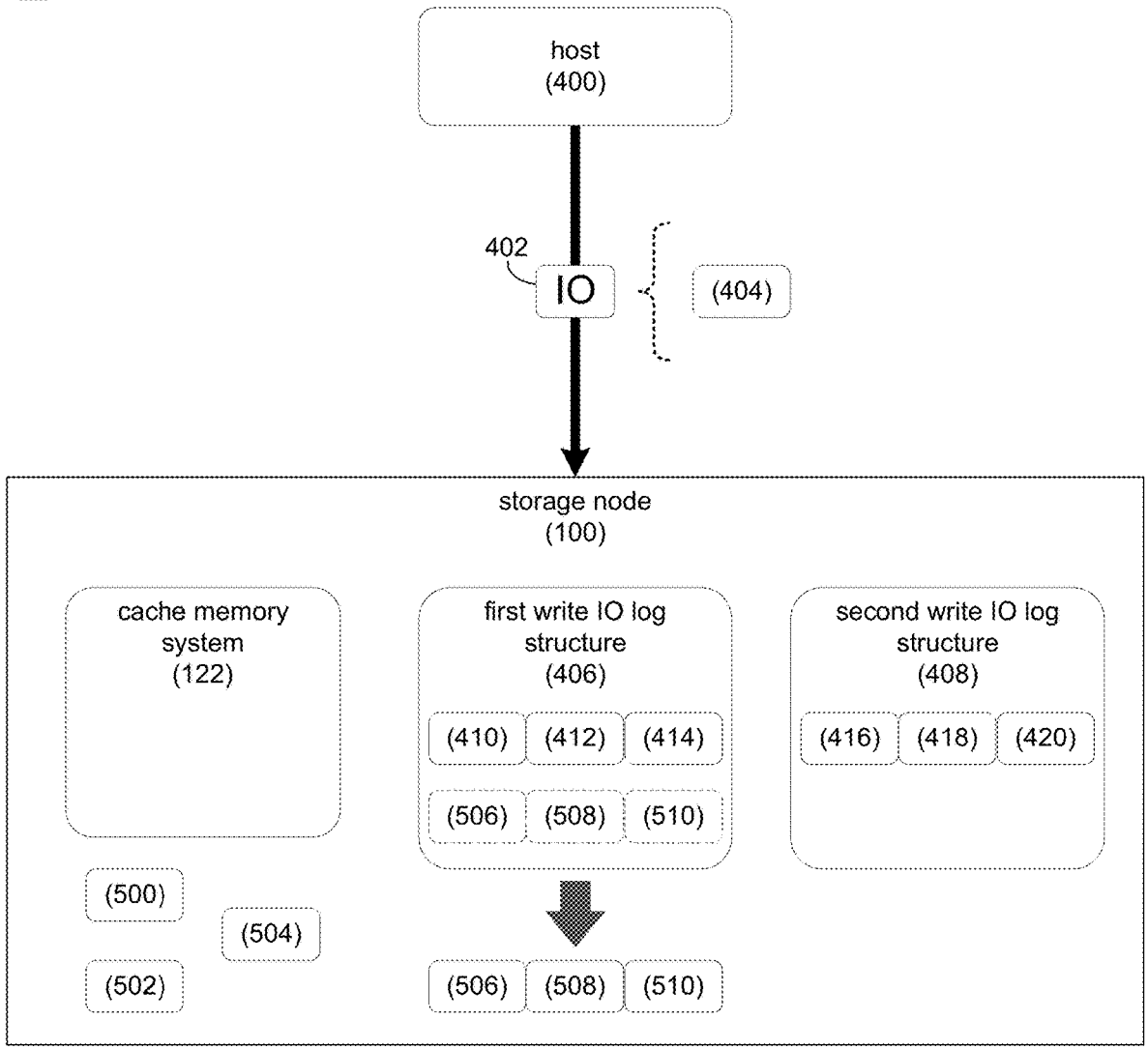

Referring also to FIG. 5 and in some implementations, log over-provisioning process 10 identifies 312 a write IO log structure with a smallest normalized amount of data moved. For example, suppose that log over-provisioning process 10 determines 310 that first write IO log structure 406 has a first normalized amount of data moved (e.g., first normalized amount of data moved 500) as described in Equation 2 and that second write IO log structure has a second normalized amount of data moved (e.g., second normalized amount of data moved 502) as described in Equation 2. In this example, log over-provisioning process 10 compares first normalized amount of data moved 500 and second normalized amount of data moved 502 to one another to determine whether the difference between the normalized amounts of data moved exceeds a predefined threshold (e.g., predefined threshold 504). In other words, log over-provisioning process 10 determines whether the normalized amount of data moved from each write IO log structure differs by more than the predefined threshold.

Suppose for this example, that the difference between first normalized amount of data moved 500 and second normalized amount of data moved 502 exceeds predefined threshold 504. In this example, log over-provisioning process 10 identifies 312 a write IO log structure with a smallest normalized amount of data moved. In this example with two write IO log structures, log over-provisioning process 10 identifies 312 the smaller normalized amount of data moved of first normalized amount of data moved 500 and second normalized amount of data moved 502. Suppose that first normalized amount of data moved 500 is the smallest normalized amount of data moved. In this example, this is indicative of first write IO log structure 406 being less utilized than second write IO log structure 408.

In some implementations, log over-provisioning process 10 increases 314 the utilization value for the write IO log structure. For example and in response to identifying 312 first write IO log structure 406 as the write IO log structure with the smallest normalized amount of data moved, log over-provisioning process 10 increases 314 the utilization value for first write IO log structure 406. In some implementations, increasing 314 the utilization value includes reclaiming 316 free storage capacity from the write IO log structure. For example, suppose that log over-provisioning process 10 identifies 312 first write IO log structure 406 as the write IO log structure with the smallest normalized amount of data moved during the monitoring interval. In this example, log over-provisioning process 10 increases 314 the utilization value for first write IO log structure 406 by reclaiming 316 free storage capacity from first write IO log structure 406. In some implementations, the amount of free storage capacity reclaimed 316 is a predefined amount. For example, log over-provisioning process 10 may use a predefined step function to determine the amount of free storage capacity to reclaim 316 from first write IO log structure 406. In some implementations, log over-provisioning process 10 may gradually increase the amount of free storage capacity reclaimed over a period of time. Accordingly, log over-provisioning process 10 may monitor the amount of free storage capacity reclaimed from a respective write IO log structure over a period of time. In this example and as shown in FIG. 5, log over-provisioning process 10 reclaims 316 free storage capacity (e.g., segments 506, 508, 510) from first write IO log structure 406. Accordingly, the utilization value for first write IO log structure 406 increases and the reclaimed segments (e.g., segments 506, 508, 510) may be re-allocated by log over-provisioning process 10.

In some implementations, log over-provisioning process 10 identifies 318 a write IO log structure with a largest normalized amount of data moved. Continuing with the above example, suppose that the difference between first normalized amount of data moved 500 and second normalized amount of data moved 502 exceeds predefined threshold 504. In this example, log over-provisioning process 10 identifies 318 a write IO log structure with the largest normalized amount of data moved. In this example with two write IO log structures, log over-provisioning process 10 identifies 318 the larger normalized amount of data moved of first normalized amount of data moved 500 and second normalized amount of data moved 502. Suppose that second normalized amount of data moved 502 is the largest normalized amount of data moved. In this example, this is indicative of second write IO log structure 408 being more utilized than first write IO log structure 406.

Figure 6:
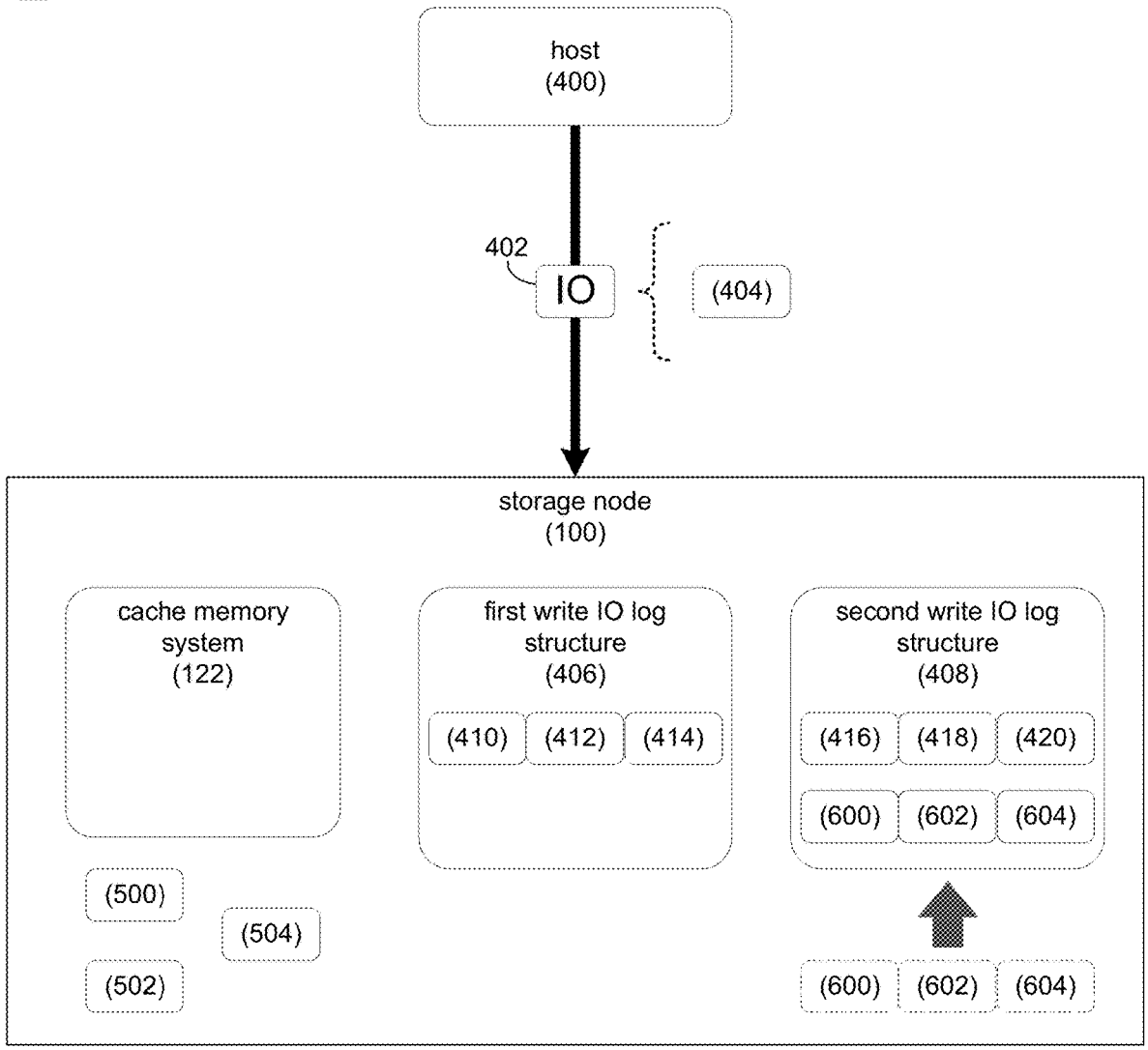

In some implementations, log over-provisioning process 10 reduces 320 the utilization value for the write IO log structure. For example and in response to identifying 318 second write IO log structure 408 as the write IO log structure with the largest normalized amount of data moved, log over-provisioning process 10 reduces 320 the utilization value for second write IO log structure 408. In some implementations, reducing 320 the utilization value includes allocating 322 additional storage capacity to second write IO log structure 408. For example, suppose that log over-provisioning process 10 identifies 318 second write IO log structure 408 as the write IO log structure with the largest normalized amount of data moved during the monitoring interval. In this example, log over-provisioning process 10 reduces 320 the utilization value for second write IO log structure 408 by allocating 322 additional storage capacity to second write IO log structure 408. In some implementations, the amount of additional storage capacity added to the write IO log structure is a predefined amount. For example, log over-provisioning process 10 may use a predefined step function to determine the amount of additional storage capacity to allocate 322 to second write IO log structure 408. In some implementations, log over-provisioning process 10 may gradually increase the amount of additional storage capacity allocated over a period of time. Accordingly, log over-provisioning process 10 may monitor the amount of additional storage capacity allocated to a respective write IO log structure over a period of time. In this example and as shown in FIG. 6, log over-provisioning process 10 allocates 322 additional storage capacity (e.g., segments 600, 602, 604) from storage system 12 to second write IO log structure 408. Accordingly, the utilization value for second write IO log structure 408 decreases and the added segments (e.g., segments 600, 602, 604) provide over-provisioning to enhance the performance of second write IO log structure 408 and storage system 12 generally.

In some implementations, log over-provisioning process 10 may use historical performance associated with each write IO log structure to dynamically allocate 304 over-provisioning resources between the plurality of write IO log structures. For example, suppose that log over-provisioning process 10 determines that first write IO log structure 406 is a data write IO log structure and that second write IO log structure 408 is a metadata write IO log structure. In this example, log over-provisioning process 10 may use historical performance associated with each write IO log structure to maintain the utilization values for each write IO log structure at particular values. Specifically, log over-provisioning process 10 may maintain the data write IO log structure at e.g., 80% utilization (e.g., by dynamically over-provisioning resources to maintain the 80% utilization value) and may maintain the metadata write IO log structure at e.g., 50% utilization (e.g., by dynamically over-provisioning resources to maintain the 50% utilization value).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    determining an amount of data moved within a plurality of write input/output (IO) log structures of a storage system during a monitoring interval;
    determining a utilization value for each write IO log structure during the monitoring interval; and
    allocating over-provisioning resources from the storage system to the plurality of write IO log structures based upon, at least in part, the amount of data moved within each write IO log structure and the utilization value for each write IO log structure.

2. The computer-implemented method of claim 1, wherein a first write IO log structure includes a data write IO log structure.

3. The computer-implemented method of claim 1, wherein a second write IO log structure includes a metadata write IO log structure.

4. The computer-implemented method of claim 1, wherein determining the amount of data moved within each write IO log structure includes determining an amount of write amplification for each write IO log structure.

5. The computer-implemented method of claim 1, wherein determining the amount of data moved within the plurality of write IO log structures includes determining a normalized amount of data moved within each write IO log structure based upon, at least in part, an amount of valid memory in each write IO log structure and an amount of free memory in each write IO log structure.

6. The computer-implemented method of claim 5, wherein allocating over-provisioning resources from the storage system to the plurality of write IO log structures includes determining that the normalized amount of data moved within each write IO log structure varies from one another by more than a predefined threshold.

7. The computer-implemented method of claim 6, further comprising:
    identifying a write IO log structure with a smallest normalized amount of data moved; and
    increasing the utilization value for the write IO log structure.

8. The computer-implemented method of claim 7 wherein increasing the utilization value includes reclaiming free storage capacity from the write IO log structure.

9. The computer-implemented method of claim 6, further comprising:
    identifying a write IO log structure with a largest normalized amount of data moved; and
    reducing the utilization value for the write IO log structure.

10. The computer-implemented method of claim 9 wherein reducing the utilization value includes allocating additional storage capacity to the write IO log structure.

11. A computer program product residing on a non-transitory computer readable medium having a plurality of instructions stored thereon which, when executed by a processor, cause the processor to perform operations comprising:
    determining an amount of data moved within a plurality of write input/output (IO) log structures of a storage system during a monitoring interval;
    determining a utilization value for each write IO log structure during the monitoring interval; and
    allocating over-provisioning resources from the storage system to the plurality of write IO log structures based upon, at least in part, the amount of data moved within each write IO log structure and the utilization value for each write IO log structure.

12. The computer program product of claim 11, wherein a first write IO log structure includes a data write IO log structure.

13. The computer program product of claim 11, wherein a second write IO log structure includes a metadata write IO log structure.

14. The computer program product of claim 11, wherein determining the amount of data moved within each write IO log structure includes determining an amount of write amplification for each write IO log structure.

15. The computer program product of claim 11, wherein determining the amount of data moved within the plurality of write IO log structures includes determining a normalized amount of data moved within each write IO log structure based upon, at least in part, an amount of valid memory in each write IO log structure and an amount of free memory in each write IO log structure.

16. The computer program product of claim 15, wherein allocating over-provisioning resources from the storage system to the plurality of write IO log structures includes determining that the normalized amount of data moved within each write IO log structure varies from one another by more than a predefined threshold.

17. The computer program product of claim 16, further comprising:
    identifying a write IO log structure with a smallest normalized amount of data moved; and increasing the utilization value for the write IO log structure.

18. A computing system comprising:

a memory; and a processor configured to determine an amount of data moved within a plurality of write input/output (IO) log structures of a storage system during a monitoring interval, to determine a utilization value for each write IO log structure during the monitoring interval, and to allocate over-provisioning resources from the storage system to the plurality of write IO log structures based upon, at least in part, the amount of data moved within each write IO log structure and the utilization value for each write IO log structure.

19. The computing system of claim 18, wherein a first write IO log structure includes a data write IO log structure.

20. The computing system of claim 18, wherein a second write IO log structure includes a metadata write IO log structure.

* * * * *